(12) United States Patent
Zawilinski et al.

(10) Patent No.: US 10,844,740 B2
(45) Date of Patent: Nov. 24, 2020

(54) AIR TURBINE STARTER WITH TURBINE AIR EXHAUST OUTLET VALVE

(71) Applicant: Hamilton Sundstrand Corporation, Charlotte, NC (US)

(72) Inventors: David J. Zawilinski, West Granby, CT (US); Scott W. Simpson, Easthampton, MA (US); Takao Fukuda, East Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 169 days.

(21) Appl. No.: 16/021,229

(22) Filed: Jun. 28, 2018

(65) Prior Publication Data

US 2020/0003072 A1 Jan. 2, 2020

(51) Int. Cl.
*F01D 17/14* (2006.01)
*F02C 7/277* (2006.01)

(52) U.S. Cl.
CPC ............ *F01D 17/145* (2013.01); *F02C 7/277* (2013.01); *F05D 2220/323* (2013.01); *F05D 2260/4031* (2013.01); *F05D 2260/52* (2013.01); *F05D 2260/57* (2013.01)

(58) Field of Classification Search
CPC ........ F01D 17/08; F01D 17/145; F01D 19/00; F01D 19/02; F05D 2220/323; F05D 2260/52; F05D 2260/57; F05D 2260/85; F05D 2260/4031; F05D 2270/02; F05D 2270/114; F05D 2250/52
See application file for complete search history.

(56) References Cited

U.S. PATENT DOCUMENTS

| | | | |
|---|---|---|---|
| 3,087,305 A | 4/1963 | Hertzog | |
| 4,916,893 A * | 4/1990 | Rodgers | F02C 3/04 60/785 |
| 7,014,419 B2 * | 3/2006 | Farnsworth | F01D 25/183 137/855 |
| 7,147,430 B2 * | 12/2006 | Wiggins | F01D 17/145 415/19 |
| 2003/0145602 A1* | 8/2003 | Lane | F01D 25/18 60/787 |
| 2015/0082805 A1* | 3/2015 | Zeiner | F01D 19/00 60/788 |
| 2016/0237909 A1* | 8/2016 | Snape | F02C 6/08 |

FOREIGN PATENT DOCUMENTS

EP  3205838 A1  8/2017

OTHER PUBLICATIONS

EP Application No. 19183229.4 Extended EP Search Report dated Oct. 25, 2019, 8 pages.

* cited by examiner

*Primary Examiner* — Brian P Wolcott
(74) *Attorney, Agent, or Firm* — Cantor Colburn LLP

(57) ABSTRACT

A system includes an air turbine starter having an inlet, a turbine air exhaust outlet, an output shaft, and a turbine in fluid communication with the inlet and the turbine air exhaust outlet. The turbine is operably coupled to the output shaft. The system also includes an outlet valve assembly configured to adjust an exhaust area of the turbine air exhaust outlet.

10 Claims, 5 Drawing Sheets

AIR TURBINE STARTER WITH TURBINE AIR EXHAUST OUTLET VALVE

BACKGROUND

This disclosure relates to gas turbine engines, and more particularly to an air turbine starter with a turbine air exhaust outlet valve for controlling rotation of a gas turbine engine.

Gas turbine engines are used in numerous applications, one of which is for providing thrust to an airplane. An air turbine starter can be used to drive rotation of a gas turbine engine and is typically used during a starting operation. An air turbine starter receives a compressed airflow and converts the airflow into mechanical motion to drive rotation of the gas turbine engine to a starting speed that allows for light-off and combustion to occur within the gas turbine engine. Once combustion is achieved within the engine, rotation is sustained, and the air turbine starter can be disengaged.

BRIEF DESCRIPTION

In an embodiment, a system includes an air turbine starter having an inlet, a turbine air exhaust outlet, an output shaft, and a turbine in fluid communication with the inlet and the turbine air exhaust outlet. The turbine is operably coupled to the output shaft. The system also includes an outlet valve assembly configured to adjust an exhaust area of the turbine air exhaust outlet.

In addition to one or more of the features described above, or as an alternative to any of the foregoing embodiments, further embodiments may include an actuator in fluid communication with the outlet valve assembly, the actuator operable to adjust the exhaust area of the turbine air exhaust outlet.

In addition to one or more of the features described above, or as an alternative to any of the foregoing embodiments, further embodiments may include where the outlet valve assembly further includes a valve housing and a valve body arranged between the valve housing and the turbine air exhaust outlet.

In addition to one or more of the features described above, or as an alternative to any of the foregoing embodiments, further embodiments may include where the valve housing includes at least one pressure port, and a pressurized cavity is formed between the at least one pressure port and the valve body responsive a pressurized flow from the actuator.

In addition to one or more of the features described above, or as an alternative to any of the foregoing embodiments, further embodiments may include at least one spring positioned between a housing of the air turbine starter and the valve body, the at least one spring configured to provide an opening force to slide the valve body towards an open position and increase the exhaust area of the turbine air exhaust outlet.

In addition to one or more of the features described above, or as an alternative to any of the foregoing embodiments, further embodiments may include where the actuator is operable to increase the pressurized flow to the pressurized cavity and provide a closing force greater than the opening force to slide the valve body towards a closed position and decrease the exhaust area of the turbine air exhaust outlet.

In addition to one or more of the features described above, or as an alternative to any of the foregoing embodiments, further embodiments may include a starter air valve in fluid communication with the inlet of the air turbine starter, where the starter air valve is operable to adjust an inlet air flow to the inlet of the air turbine starter.

According to another aspect, a system of an aircraft includes an air turbine starter including a turbine operably coupled an output shaft, the output shaft coupled to a gearbox of a gas turbine engine. The system also includes an outlet valve assembly configured to adjust an exhaust area of a turbine air exhaust outlet of the turbine. The system further includes a controller operable to actuate the outlet valve assembly to drive rotation of the output shaft responsive to an inlet air flow received at an inlet of the air turbine starter and the exhaust area of the turbine air exhaust outlet, where the output shaft drives rotation of the gas turbine engine through the gearbox.

In addition to one or more of the features described above, or as an alternative to any of the foregoing embodiments, further embodiments may include where the controller is operable to command an actuator in fluid communication with the outlet valve assembly, the actuator operable to adjust the exhaust area of the turbine air exhaust outlet.

In addition to one or more of the features described above, or as an alternative to any of the foregoing embodiments, further embodiments may include where the controller is operable to command the actuator to increase a pressurized flow to a pressurized cavity and provide a closing force greater than the opening force to slide a valve body towards a closed position and decrease the exhaust area of the turbine air exhaust outlet.

In addition to one or more of the features described above, or as an alternative to any of the foregoing embodiments, further embodiments may include a starter air valve in fluid communication with the inlet of the air turbine starter, where the controller is operable to control the starter air valve to adjust the inlet air flow to the inlet of the air turbine starter.

According to an aspect, a method includes determining an operating mode of an air turbine starter and actuating an outlet valve assembly to adjust an exhaust area of the turbine air exhaust outlet of the air turbine starter based on the operating mode. The method further includes driving rotation of an output shaft of the air turbine starter responsive to an inlet air flow received at an inlet of the air turbine starter and the exhaust area of the turbine air exhaust outlet.

In addition to one or more of the features described above, or as an alternative to any of the foregoing embodiments, further embodiments may include commanding an actuator in fluid communication with the outlet valve assembly to adjust the exhaust area of the turbine air exhaust outlet.

In addition to one or more of the features described above, or as an alternative to any of the foregoing embodiments, further embodiments may include where the actuator is commanded to control a pressurized flow through at least one pressure port of a valve housing of the outlet valve assembly into a pressurized cavity formed between the at least one pressure port and a valve body arranged between the valve housing and the turbine air exhaust outlet.

In addition to one or more of the features described above, or as an alternative to any of the foregoing embodiments, further embodiments may include providing an opening force by at least one spring to slide the valve body towards an open position and increase the exhaust area of the turbine air exhaust outlet.

In addition to one or more of the features described above, or as an alternative to any of the foregoing embodiments, further embodiments may include commanding the actuator to increase the pressurized flow to the pressurized cavity and provide a closing force greater than the opening force to slide the valve body towards a closed position and decrease the exhaust area of the turbine air exhaust outlet.

In addition to one or more of the features described above, or as an alternative to any of the foregoing embodiments, further embodiments may include commanding the actuator to slide the valve body to an intermediate position between the closed position and the open position based on determining that the operating mode comprises an extended motoring mode below a nominal starting speed of the air turbine starter.

In addition to one or more of the features described above, or as an alternative to any of the foregoing embodiments, further embodiments may include controlling a starter air valve in fluid communication with the inlet of the air turbine starter to adjust the inlet air flow to the inlet of the air turbine starter.

A technical effect of the systems and methods is achieved by using an outlet valve assembly to adjust an exhaust area of a turbine air exhaust outlet in an air turbine starter and thereby control turbine pressure, speed, and/or torque as described herein.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
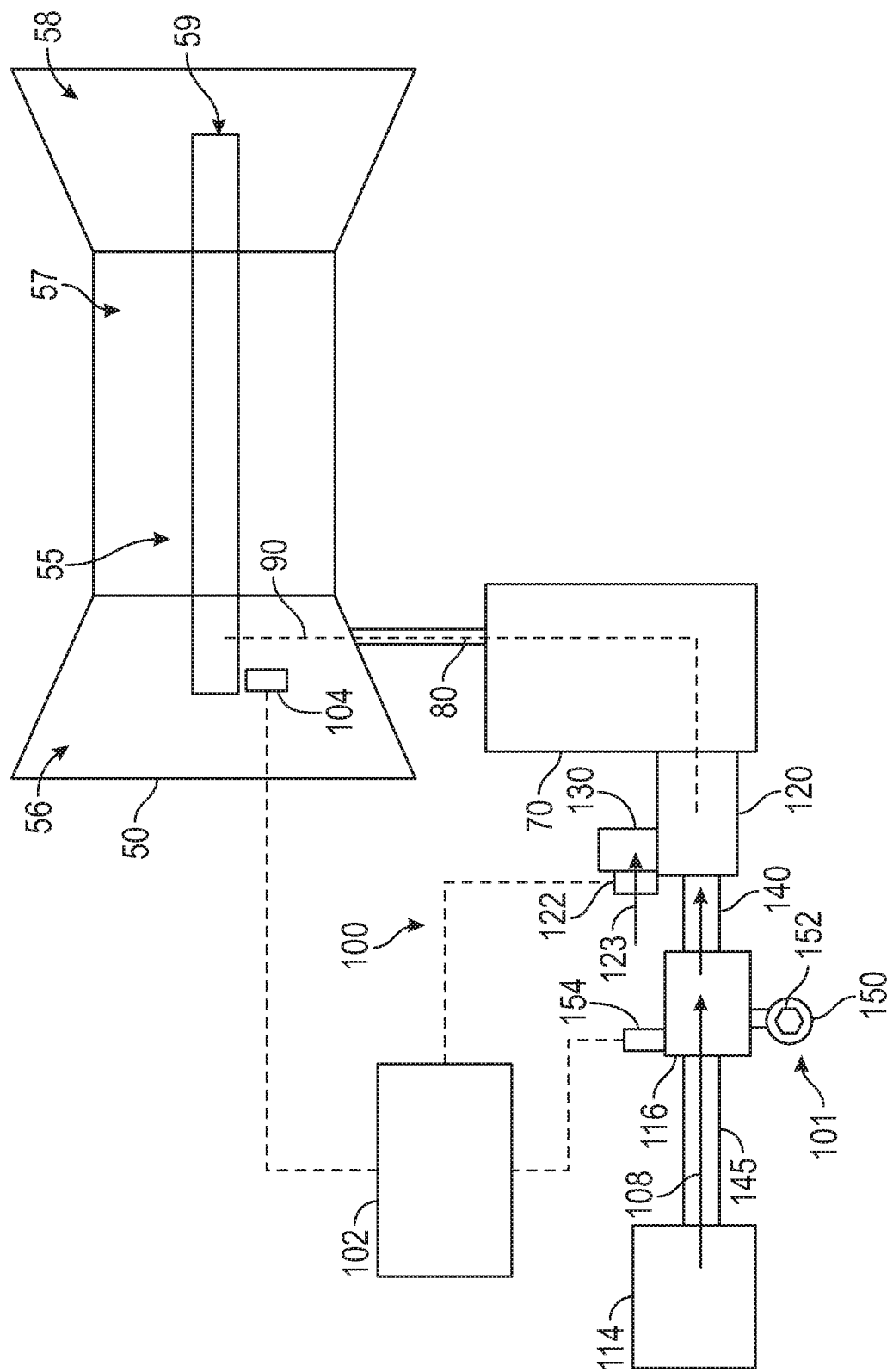
FIG. 1 is a schematic illustration of an aircraft engine starting system in accordance with an embodiment of the disclosure.

A detailed description of one or more embodiments of the disclosed apparatus and method are presented herein by way of exemplification and not limitation with reference to the Figures.

When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine, which can result in a "bowed rotor" condition. If a gas turbine engine is in such a bowed rotor condition, it is undesirable to restart or start the engine.

One approach to mitigating a bowed rotor condition is to use a starter system to drive rotation (i.e., cool-down motoring) of a spool within the engine for an extended period of time at a speed below which a resonance occurs (i.e., a critical speed or frequency) that may lead to damage when a sufficiently large bowed rotor condition is present. If a starter air valve that controls the flow of air into the starter system fails closed, the starter system may be incapable of performing cool-down motoring. Manual operation of the starter air valve may be incapable of accurate control of the cool-down motoring speed, potentially reaching the resonance speed.

Further, in normal starting sequences, engines may have different starting performance parameters that can make it difficult for the same starting system to be used on engines of different sizes, different starting speeds, and the like. For example, engines with different thrust ratings may have different starting system requirements that limit the ability to reuse starting system components across various engine configurations.

Various embodiments of the present disclosure are related to air turbine starter control for a gas turbine engine. Embodiments can include using an outlet valve assembly to control a rotor speed of a starting spool of a gas turbine engine to mitigate a bowed rotor condition using a cool-down motoring process. In some embodiments, the outlet valve assembly can be used as a backup control to adjust the speed of an air turbine starter when a starter air valve upstream of the air turbine starter is inoperable. In alternate embodiments, the outlet valve assembly can provide a primary speed control for the air turbine starter where a starter air valve is omitted. Further, speed control can include a combination of adjustments to both an outlet valve assembly and a starter air valve to modify inlet airflow and/or exhaust flow in achieving a targeted pressure ratio across a turbine of the air turbine starter.

Under normal operation during cool-down motoring, the starter air valve can be actively adjusted to deliver air pressure (i.e., compressed air) from an air supply to an air turbine starter of an engine starting system that controls starting spool rotor speed. The outlet valve assembly may also be controlled to adjust an exhaust area of the turbine air exhaust outlet to partially or fully open to a positon to further control performance of the air turbine starter. Cool-down motoring may be performed by running an engine starting system at a lower speed with a longer duration than typically used for engine starting. Speed reduction can be achieved by dynamically adjusting the starter air valve and/or using the outlet valve assembly to adjust the exhaust area of the turbine air exhaust outlet to maintain a rotor speed and/or profile (e.g., a ramp function). A critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in a high pressure compressor, for example.

In some embodiments, when a starter air valve fails shut, a manual override can be adjusted to open the starter air valve, and the outlet valve assembly can be used to establish a regulated pressure to limit a motoring speed of the gas turbine engine below a resonance speed of a starting spool of the gas turbine engine. The outlet valve assembly may also be used during normal start operation to adjust for engine speed/torque requirements when driven by the air turbine starter. For instance, if a compressed airflow received at the air turbine starter would potentially drive rotation of the gas turbine engine at a greater speed or with greater torque than is needed to support starting operations, the outlet valve assembly can be used to adjust the outlet exhaust to modify the turbine performance of the air turbine starter and thus change the output characteristics of the air turbine starter.

Referring now to the figures, FIG. 1 shows a block diagram of a gas turbine engine 50 and an associated engine starting system 100 with a valve system 101 according to an embodiment of the present disclosure. The valve system 101 can include a starter air valve 116 operably connected in fluid communication with an air turbine starter 120 of the engine starting system 100 through at least one duct 140. The valve system 101 is operable to receive a compressed air flow from a compressed air source 114 through one or more ducts 145. The compressed air source 114 can be an auxiliary power unit, a ground cart, or a cross-engine bleed, for example. The valve system 101 can also include an outlet valve assembly 130 operable to adjust an exhaust area of a turbine air exhaust outlet of the air turbine starter 120. The outlet valve assembly 130 can be driven by a pressurized flow 123 controlled by an actuator 122, such as a torque motor or other device capable of establishing a range of position settings, which can be locally or remotely located with respect to the outlet valve assembly 130. The pressurized flow 123 can be sourced from the compressed air source 114 or another source (not depicted). During regular operation, the starter air valve 116 may be opened and closed using a solenoid 154. The solenoid 154 may be modulated to control a motoring speed of the gas turbine engine 50 during cool-down motoring. The solenoid 154 can control an actuation air flow (which may be from the compressed air source 114) used to open or close the starter air valve 116. The solenoid 154 and the actuator 122 may be in electrical communication with an electronic engine controller 102 (also referred to as controller 102). The electronic engine controller 102 can monitor motoring and other speed-related conditions using, for example, a speed sensor 104. In some embodiments, speeds can be derived from other components, such as an alternator/generator (not depicted) frequency indicative of a rotational speed driven through an accessory gearbox 70.

The air turbine starter 120 of the engine starting system 100 is operably connected to the gas turbine engine 50 through the accessory gearbox 70 and drive shaft 80 (e.g., a tower shaft), as shown in FIG. 1. As depicted in the example of FIG. 1, the air turbine starter 120 is connected to the gas turbine engine 50 by a drive line 90, which runs from an output of the air turbine starter 120 to the accessory gearbox 70 through the drive shaft 80 to a rotor shaft 59 of the gas turbine engine 50. Operable connections can include gear mesh connections that in some instances can be selectively engaged or disengaged, for instance, through one or more clutches. The air turbine starter 120 is configured to initiate a startup process of the gas turbine engine 50 driving rotation of the rotor shaft 59 of a starting spool 55 of the gas turbine engine 50. The rotor shaft 59 operably connects an engine compressor 56 to an engine turbine 58. Thus, once the engine compressor 56 starts spinning, air is pulled into combustion chamber 57 and mixes with fuel for combustion. Once the air and fuel mixture combusts in the combustion chamber 57, a resulting compressed gas flow drives rotation of the engine turbine 58, which rotates the engine turbine 58 and subsequently the engine compressor 56. Once the startup process has been completed, the air turbine starter 120 can be disengaged from the gas turbine engine 50 to prevent over-speed conditions when the gas turbine engine 50 operates at its normal higher speeds. Although only a single instance of an engine compressor-turbine pair of starting spool 55 is depicted in the example of FIG. 1, it will be understood that embodiments can include any number of spools, such as high/mid/low pressure engine compressor-turbine pairs within the gas turbine engine 50.

The air turbine starter 120 is further operable to drive rotation of the rotor shaft 59 at a lower speed for a longer duration than typically used for engine starting in an extended motoring mode of operation (also referred to as cool-down motoring) to prevent/reduce a bowed rotor condition. If a bowed rotor condition has developed, for instance, due to a hot engine shutdown and without taking further immediate action, cool-down motoring may be performed by the air turbine starter 120 to reduce a bowed rotor condition by driving rotation of the rotor shaft 59.

Controller 102, such as a full authority digital engine control (FADEC), can control valve operation, for instance, modulation of the starter air valve 116 to control a motoring speed of the gas turbine engine 50 during cool-down motoring. If the starter air valve 116 fails shut, a corresponding manual override 150 can be used to manually open the starter air valve 116. The manual override 150 can include a tool interface 152 to enable a ground crew to open the starter air valve 116. When starter air valve 116 fails shut, the manual override 150 can be used to open the starter air valve 116. The outlet valve assembly 130 can be controlled to provide a turbine exhaust regulation to drive rotation of the air turbine starter 120 for cool-down motoring of the gas turbine engine 50. For example, the actuator 122 can selectively position a valve body of the outlet valve assembly 130 to limit a motoring speed of the gas turbine engine 50 below a resonance speed of the starting spool 55 of the gas turbine engine 50 responsive to an inlet air flow 108 from the compressed air source 114, for instance, by controlling an exhaust area of a turbine air exhaust outlet of the air turbine starter 120. In some embodiments, the outlet valve assembly 130 can be enabled responsive to manual override state detection by the controller 102, which may use a switch or sensor that indicates whether the manual override 150 is in an open position.

In an embodiment, the controller 102 can include memory to store instructions that are executed by one or more processors on one or more channels. The executable instructions may be stored or organized in any manner and at any level of abstraction, such as in connection with a controlling and/or monitoring operation of the gas turbine engine 50 of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

The controller 102 can be configured with control laws to maintain a motoring speed below a threshold level (i.e., the resonance speed) for the gas turbine engine 50 of FIG. 1 while performing cool-down motoring based on compressed air source 114. In embodiments, the controller 102 can observe various engine parameters and starting system parameters to actively control cool-down motoring and prevent fault conditions from damaging the gas turbine engine 50. For example, controller 102 can observe engine speed (N2) of gas turbine engine 50 and may receive starter system parameters such as starter speed (NS) and/or starter air pressure (SAP).

Under normal operating conditions, one or more channels of the controller 102 can alternate on and off commands to the solenoid 154 coupled to the starter air valve 116 to achieve a partially open position of the starter air valve 116 to control a flow of compressed air from compressed air source 114 as a starter air flow to air turbine starter 120 during cool-down motoring. The air turbine starter 120 outputs torque to drive rotation of gas turbine engine shaft 59 of the starting spool 55 of the gas turbine engine 50. The controller 102 can monitor engine speed (N2), starter speed (NS), starter air pressure (SAP), and/or other engine parameters to determine an engine operating state and control the starter air valve 116. Thus, the controller 102 can establish a control loop with respect to a motoring speed (N2 and/or NS) and/or starter air pressure (SAP) to adjust positioning of the starter air valve 116. The controller 102 can also or alternatively control the outlet valve assembly 130 using one or more feedback loops based on speed, pressure, or torque, for example.

In some embodiments, the starter air valve 116 can be a variable position valve that is dynamically adjustable to selected valve angles by the controller 102. When implemented as a variable position valve, the starter air valve 116 can be continuous/infinitely adjustable and hold a commanded valve angle, which may be expressed in terms of a percentage open/closed and/or an angular value (e.g., degrees or radians). Performance parameters of the starter air valve 116 can be selected to meet dynamic response requirements. In some embodiments, the controller 102 can monitor a valve angle of the starter air valve 116 when valve angle feedback is available. The controller 102 can establish an outer control loop with respect to motoring speed and an inner control loop with respect to the valve angle of the starter air valve 116.

Figure 2:
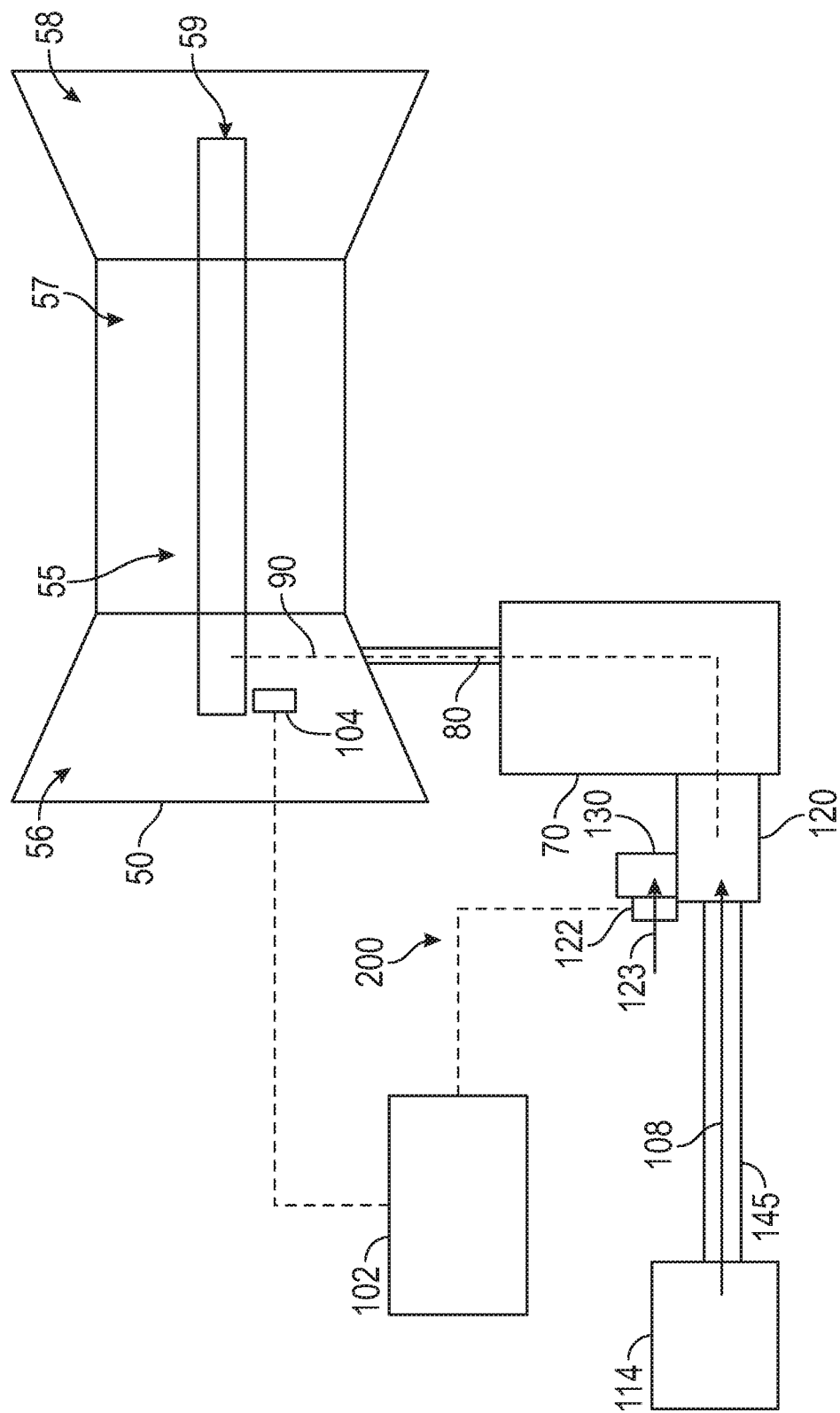
FIG. 2 is another schematic illustration of an aircraft engine starting system in accordance with an embodiment of the disclosure.

Turning now to FIG. 2, another embodiment of an engine starting system 200 of an aircraft is depicted. Similar to FIG. 1, where like numbers indicate like elements, the engine starting system 200 includes the outlet valve assembly 130 in fluid communication with the air turbine starter 120 to drive motoring of the rotor shaft 59 of the gas turbine engine 50 responsive to inlet air flow 108 from the compressed air source 114. In the example of FIG. 2, the starter air valve 116 of FIG. 1 is omitted and all operations typically performed using the starter air valve 116 can be performed using the outlet valve assembly 130. Further details of the outlet valve assembly 130 and the air turbine starter 120 are provided with respect to FIGS. 3-6.

Figure 3:
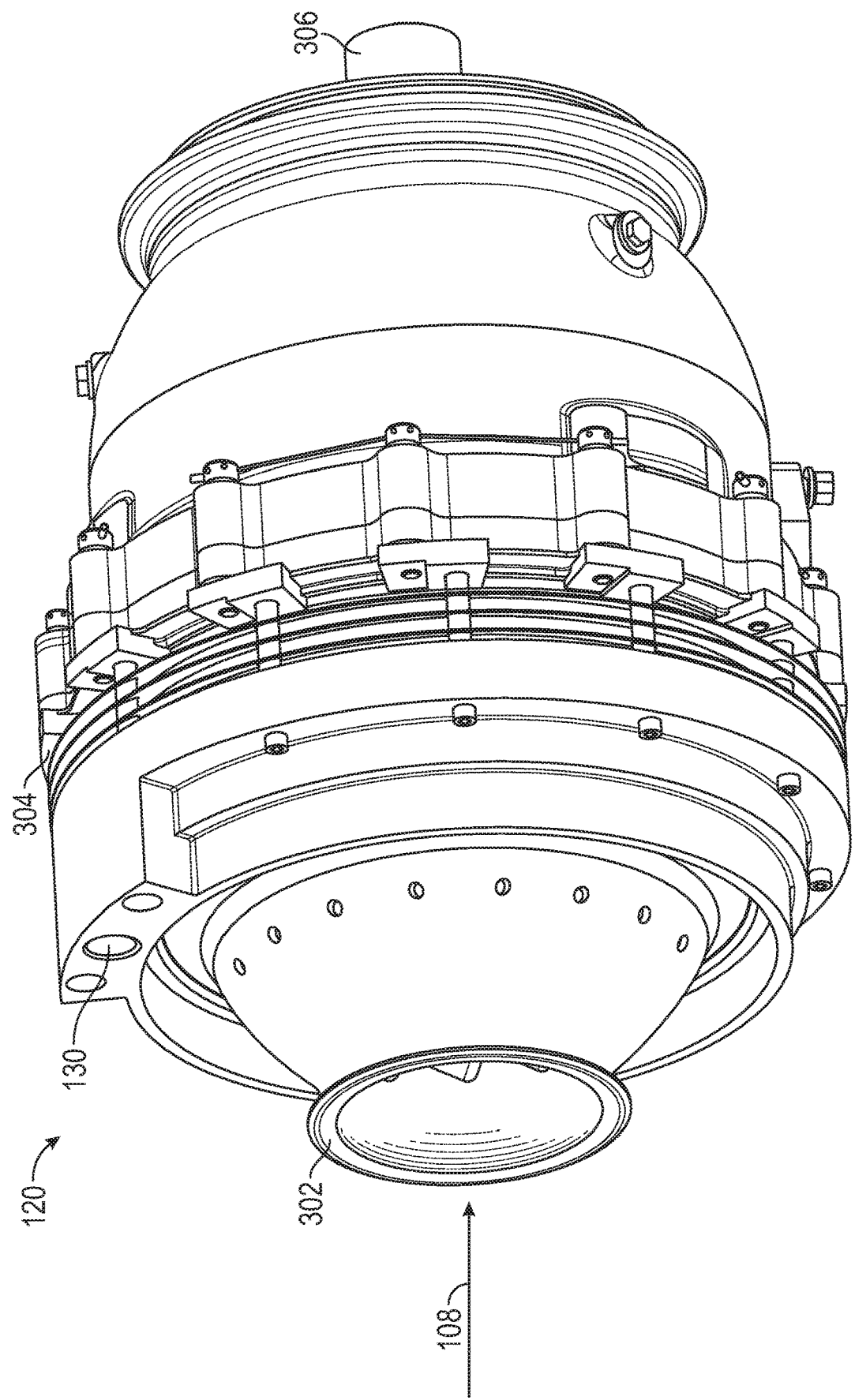
FIG. 3 is a perspective view of an air turbine starter with an outlet valve assembly according to an embodiment of the disclosure.

FIG. 3 is a perspective view of the air turbine starter 120 with outlet valve assembly 130 of FIGS. 1-2 according to an embodiment. An inlet 302 of the air turbine starter 120 is configured to receive the inlet air flow 108. The outlet valve assembly 130 can be actuated, e.g., using actuator 122 of FIGS. 1 and 2, to adjust an exhaust area of a turbine air exhaust outlet 304 of the air turbine starter 120. Rotation of an output shaft 306 of the air turbine starter 120 can be driven responsive to the inlet air flow 108 received at the inlet 302 of the air turbine starter 120 and the exhaust area of the turbine air exhaust outlet 304.

Figure 4:
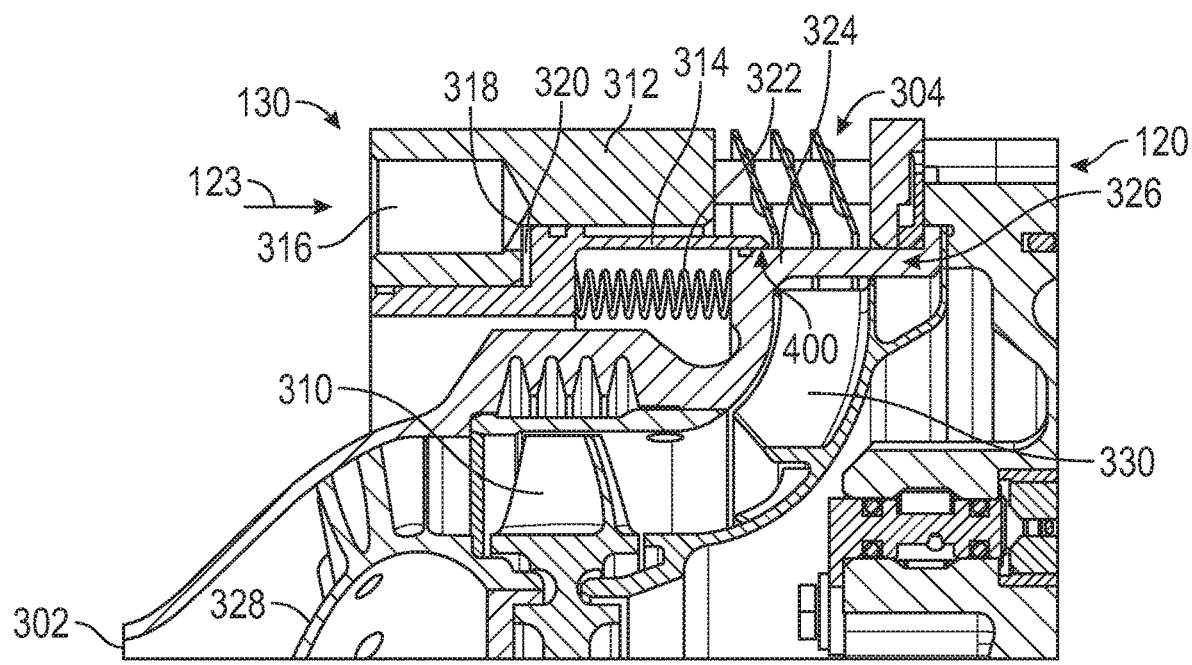
FIG. 4 is a partial sectional view of an air turbine starter with a turbine air exhaust outlet in a fully opened position according to an embodiment of the disclosure.

FIG. 4 depicts a partial sectional view of the air turbine starter 120 with the turbine air exhaust outlet 304 in a fully open position 400 according to an embodiment. The air turbine starter 120 includes a turbine 310 in fluid communication with the inlet 302 and the turbine air exhaust outlet 304. The turbine 310 can be operably coupled to the output shaft 306 of FIG. 3, for example, through a gear train or other intermediary components between the turbine 310 and the output shaft 306. The outlet valve assembly 130 includes a valve housing 312 and a valve body 314 arranged between the valve housing 312 and the turbine air exhaust outlet 304. The valve housing 312 can include one or more bores 316 operable to receive the pressurized flow 123 from the actuator 122 of FIGS. 1 and 2. The valve housing 312 can also include at least one pressure port 318 having a smaller diameter than the bores 316 and in fluid communication with the bores 316. A pressurized cavity 320 can be formed between the at least one pressure port 318 and the valve body 314 responsive the pressurized flow 123, where the volume of the pressurized cavity 320 increases as the force of the pressurized flow 123 increases. At least one spring 322 can be positioned between a housing 324 of the air turbine starter 120 and the valve body 314. The at least one spring 322 can be configured to provide an opening force to slide the valve body 314 towards an open position 400 and increase an exhaust area 326 of the turbine air exhaust outlet 304. Speed, torque, and pressure ratios for the turbine 310 can be governed by effects of a nozzle 328 and vanes 330 of the air turbine starter 120 as the inlet air flow 108 transitions through the air turbine starter 120 to the turbine air exhaust outlet 304, and the turbine 310 is driven to rotate. The controller 102 of FIGS. 1 and 2 can adjust the exhaust area 326 of the turbine air exhaust outlet 304 according to one or more torque versus speed tables and/or equations that characterize system performance.

Figure 5:
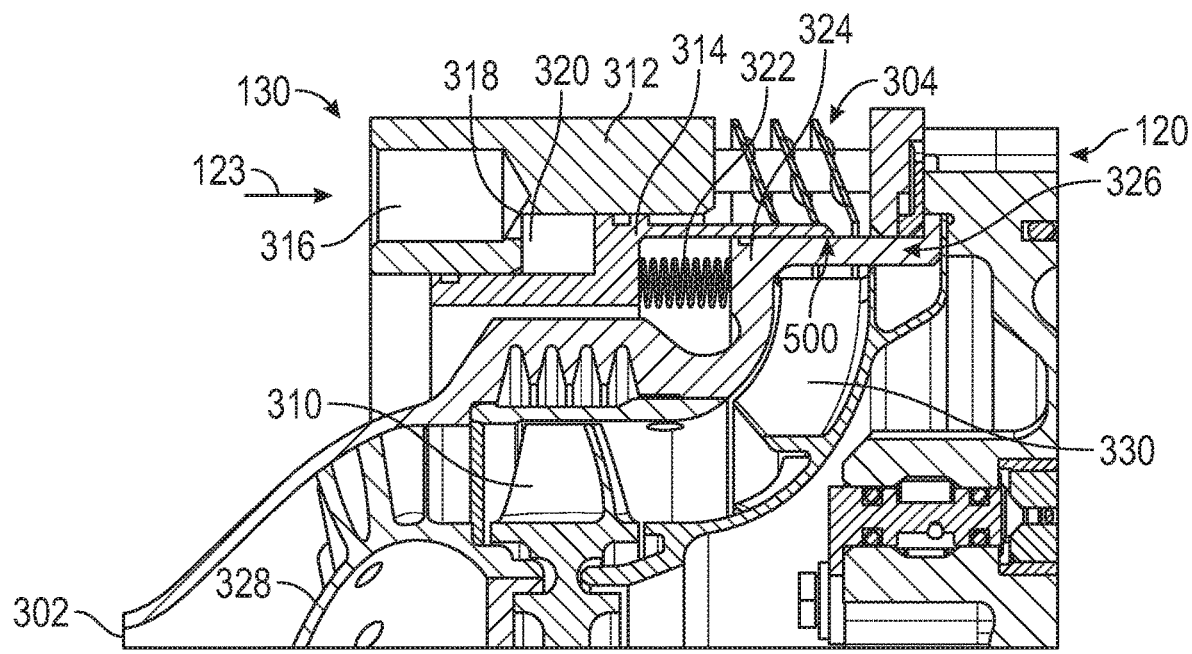
FIG. 5 is a partial sectional view of an air turbine starter with a turbine air exhaust outlet in a partially opened position according to an embodiment of the disclosure.
Figure 6:
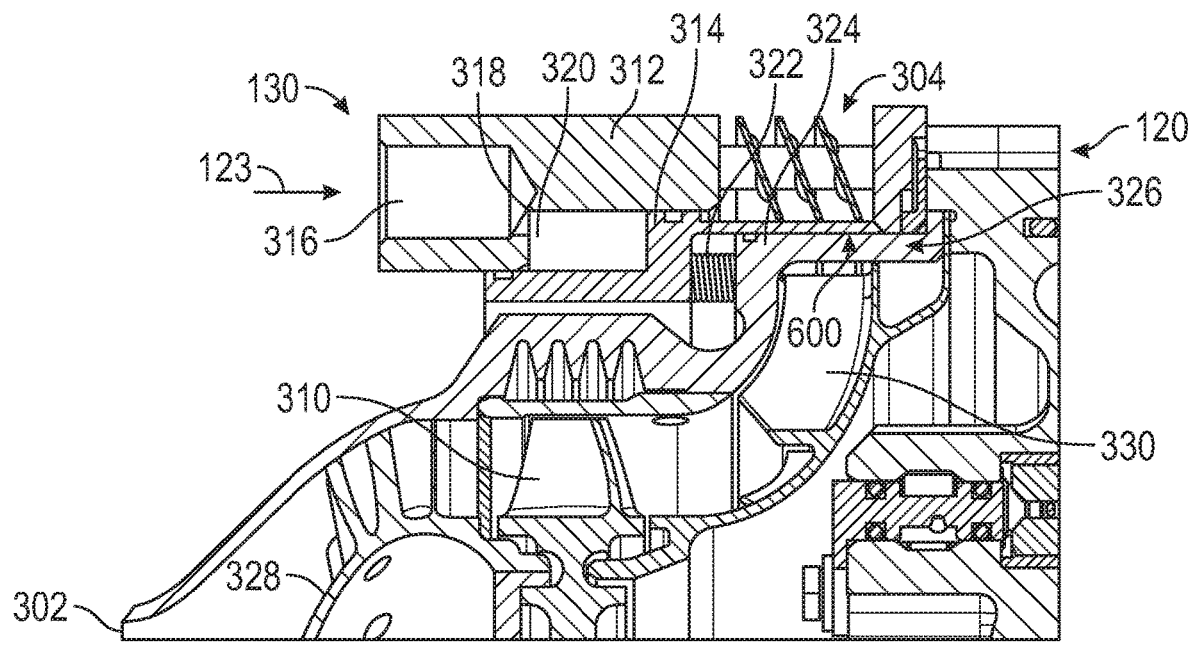
FIG. 6 is a partial sectional view of an air turbine starter with a turbine air exhaust outlet in a closed position according to an embodiment of the disclosure.

FIG. 5 is a partial sectional view of the air turbine starter 120 with the turbine air exhaust outlet 304 in a partially opened position 500 (also referred to as an intermediate position), and FIG. 6 is a partial sectional view of the air turbine starter 120 with the turbine air exhaust outlet 304 in a closed position 600. In embodiments, the actuator 122 of FIGS. 1 and 2 is operable to increase the pressurized flow 123 to the pressurized cavity 320 and provide a closing force greater than the opening force to slide the valve body 314 towards a closed position 600 and decrease the exhaust area 326 of the turbine air exhaust outlet 304. The partially opened position 500 is an example of an intermediate position between the closed position 600 and the open position 400, which can be used, for example, to support an extended motoring mode below a nominal starting speed of the air turbine starter 120, such as to mitigate a bowed rotor condition of the gas turbine engine 50 of FIG. 1.

Figure 7:
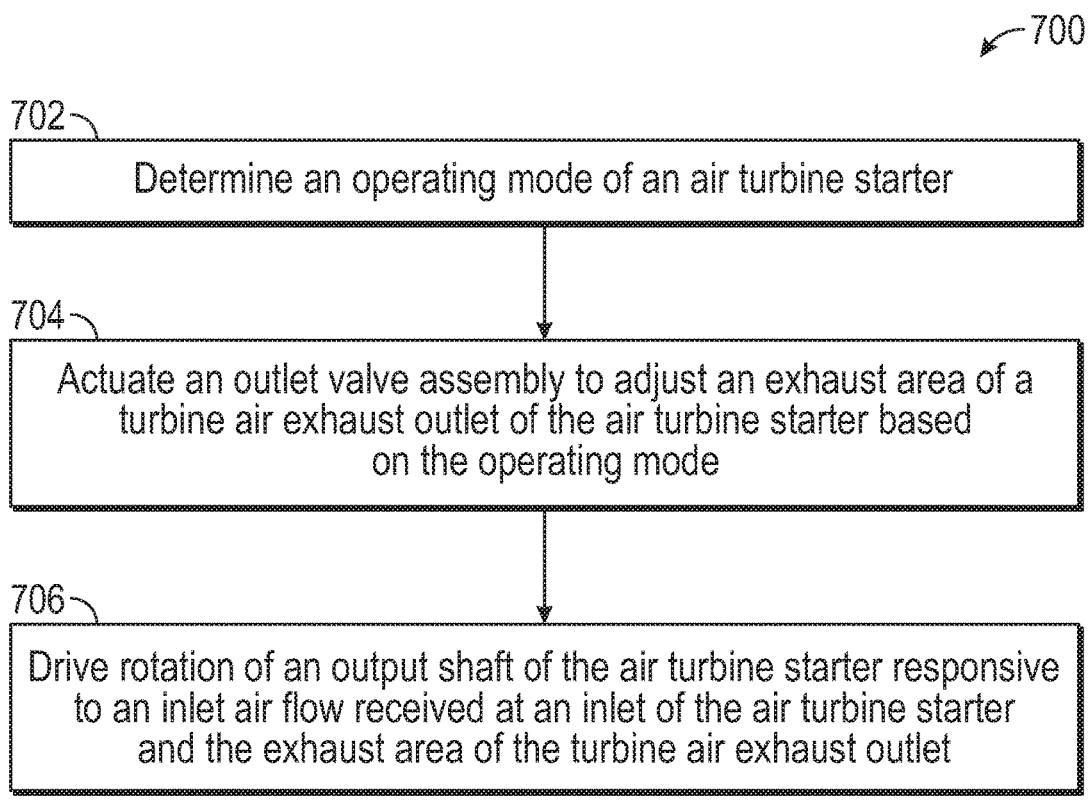
FIG. 7 is a flow chart illustrating a method in accordance with an embodiment of the disclosure.

FIG. 7 is a flow chart illustrating a method 700 for controlling an air turbine starter in accordance with an embodiment. The method 700 of FIG. 7 is described in reference to FIGS. 1-7 and may be performed with an alternate order and include additional steps.

At block 702, a controller 102 determines an operating mode of an air turbine starter 120. The operating mode can be determined as a normal starting mode or a bowed rotor starting mode when a command to start the gas turbine engine 50 is received. For example, models and/or stored/observed engine/aircraft state data of the gas turbine engine 50 can be used to determine a likelihood of a bowed rotor condition existing for the gas turbine engine 50. If a bowed rotor condition exists, then a bowed rotor operating mode of the air turbine starter 120 can have a different speed or torque setting as compared to a normal engine starting process. In some embodiments, if a non-responsive starter air valve 116 is detected, the starter air valve 116 can be fully opened using the manual override 150 before or during the method 700.

At block 704, the controller 102 can actuate an outlet valve assembly 130 to adjust an exhaust area 326 of the turbine air exhaust outlet 304 of the air turbine starter 120 based on the operating mode. An actuator 122 in fluid communication with the outlet valve assembly 130 can be commanded to adjust the exhaust area 326 of the turbine air exhaust outlet 304 by modifying a percentage of the pressurized flow 123 allowed to reach the pressurized cavity 320. An opening force can be provided by at least one spring 322 to slide the valve body 314 towards an open position 400 and increase the exhaust area 326 of the turbine air exhaust outlet 304. The actuator 122 can be commanded to increase the pressurized flow 123 to the pressurized cavity 320 and provide a closing force greater than the opening force to slide the valve body 314 towards a closed position 600 and decrease the exhaust area 326 of the turbine air exhaust outlet 304. The actuator 122 can be commanded to slide the valve body 314 to an intermediate position (e.g., partially opened position 500) between the closed position 600 and the open position 400 based on determining that the operating mode is an extended motoring mode below a nominal starting speed of the air turbine starter 120.

At block 706, the controller 102 can drive rotation of an output shaft 306 of the air turbine starter 120 responsive to an inlet air flow 108 received at an inlet 302 of the air turbine starter 120 and the exhaust area 326 of the turbine air exhaust outlet 304.

While the above description has described the flow process of FIG. 7 in a particular order, it should be appreciated that unless otherwise specifically required in the attached claims that the ordering of the steps may be varied.

Accordingly and as mentioned above, it is desirable to detect, prevent and/or clear a "bowed rotor" condition in a gas turbine engine that may occur after the engine has been shut down. As described herein and in one non-limiting embodiment, the controller 102 may be programmed to automatically take the necessary measures in order to provide for a modified start sequence without pilot intervention other than the initial start request. In an exemplary embodiment, the controller 102 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the controller 102 may include, but not be limited to, a processor(s), computer(s), memory, storage, register(s), timing, interrupt(s), communication interfaces, and input/output signal interfaces, as well as combinations comprising at least one of the foregoing. For example, the controller 102 may include input signal filtering to enable accurate sampling and conversion or acquisitions of such signals from communications interfaces. As described above, exemplary embodiments of the disclosure can be implemented through computer-implemented processes and apparatuses for practicing those processes.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    an air turbine starter comprising:
        an inlet;
        a turbine air exhaust outlet;
        an output shaft; and
        a turbine in fluid communication with the inlet and the turbine air exhaust outlet, the turbine operably coupled to the output shaft;
        an outlet valve assembly configured to adjust an exhaust area of the turbine air exhaust outlet, wherein the outlet valve assembly comprises a valve housing and a valve body arranged between the valve housing and the turbine air exhaust outlet, the valve housing comprises at least one pressure port, and a pressurized cavity is formed between the at least one pressure port and the valve body responsive a pressurized flow from the actuator;
        an actuator in fluid communication with the outlet valve assembly, the actuator operable to adjust the exhaust area of the turbine air exhaust outlet by sliding the valve body between an open position and a closed position in the turbine air exhaust outlet; and
        at least one spring positioned between a housing of the air turbine starter and the valve body, the at least one spring configured to provide an opening force to slide the valve body towards the open position and increase the exhaust area of the turbine air exhaust outlet.

2. The system as in claim 1, wherein the actuator is operable to increase the pressurized flow to the pressurized cavity and provide a closing force greater than the opening force to slide the valve body towards the closed position and decrease the exhaust area of the turbine air exhaust outlet.

3. The system as in claim 1, further comprising a starter air valve in fluid communication with the inlet of the air turbine starter, wherein the starter air valve is operable to adjust an inlet air flow to the inlet of the air turbine starter.

4. A system of an aircraft, the system comprising:
an air turbine starter comprising a turbine operably coupled an output shaft, the output shaft coupled to a gearbox of a gas turbine engine;
an outlet valve assembly configured to adjust an exhaust area of a turbine air exhaust outlet of the turbine, wherein the outlet valve assembly comprises a valve housing and a valve body arranged between the valve housing and the turbine air exhaust outlet, the valve housing comprises at least one pressure port, and a pressurized cavity is formed between the at least one pressure port and the valve body responsive a pressurized flow from the actuator;
a controller operable to actuate the outlet valve assembly to slide the valve body between an open position and a closed position in the turbine air exhaust outlet to adjust the exhaust area of the turbine air exhaust outlet and drive rotation of the output shaft responsive to an inlet air flow received at an inlet of the air turbine starter and the exhaust area of the turbine air exhaust outlet, wherein the output shaft drives rotation of the gas turbine engine through the gearbox; and
at least one spring positioned between a housing of the air turbine starter and the valve body, the at least one spring configured to provide an opening force to slide the valve body towards the open position and increase the exhaust area of the turbine air exhaust outlet.

5. The system as in claim 4, wherein the controller is operable to command the actuator to increase the pressurized flow to the pressurized cavity and provide a closing force greater than the opening force to slide the valve body towards the closed position and decrease the exhaust area of the turbine air exhaust outlet.

6. The system as in claim 4, further comprising a starter air valve in fluid communication with the inlet of the air turbine starter, wherein the controller is operable to control the starter air valve to adjust the inlet air flow to the inlet of the air turbine starter.

7. A method comprising:
determining an operating mode of an air turbine starter;
actuating an outlet valve assembly to slide a valve body between an open position and a closed position in a turbine air exhaust outlet to adjust an exhaust area of the turbine air exhaust outlet of the air turbine starter based on the operating mode, by commanding an actuator in fluid communication with the outlet valve assembly to adjust the exhaust area of the turbine air exhaust outlet, wherein the actuator is commanded to control a pressurized flow through at least one pressure port of a valve housing of the outlet valve assembly into a pressurized cavity formed between the at least one pressure port and the valve body arranged between the valve housing and the turbine air exhaust outlet;
providing an opening force by at least one spring to slide the valve body towards the open position and increase the exhaust area of the turbine air exhaust outlet; and
driving rotation of an output shaft of the air turbine starter responsive to an inlet air flow received at an inlet of the air turbine starter and the exhaust area of the turbine air exhaust outlet.

8. The method as in claim 7, further comprising:
commanding the actuator to increase the pressurized flow to the pressurized cavity and provide a closing force greater than the opening force to slide the valve body towards the closed position and decrease the exhaust area of the turbine air exhaust outlet.

9. The method as in claim 7, further comprising:
commanding the actuator to slide the valve body to an intermediate position between the closed position and the open position based on determining that the operating mode comprises an extended motoring mode below a nominal starting speed of the air turbine starter.

10. The method as in claim 7, further comprising:
controlling a starter air valve in fluid communication with the inlet of the air turbine starter to adjust the inlet air flow to the inlet of the air turbine starter.

\* \* \* \* \*